United States Patent [19]

Fukawa et al.

[11] 4,208,356
[45] Jun. 17, 1980

[54] PROCESS FOR PRODUCING MIXTURE OF BLOCK COPOLYMERS

[75] Inventors: Isaburo Fukawa; Kunio Satake, both of Yokohamashi; Tsuyoshi Yamada, Yokosukashi; Kiyoshi Hayakawa, Yokohamashi; Yasushi Sato, Kawasakishi, all of Japan

[73] Assignee: Asahi Kasei Kogyo Kabushiki Kaisha, Osaka, Japan

[21] Appl. No.: 609,684

[22] Filed: Sep. 2, 1975

[30] Foreign Application Priority Data

Sep. 17, 1974 [JP] Japan .................. 49-105970
Mar. 7, 1975 [JP] Japan .................. 50-27064

[51] Int. Cl.² ........................................ C08F 297/04
[52] U.S. Cl. .......................................... 525/89
[58] Field of Search ............ 260/880 B, 876 B, 880 R

[56] References Cited

U.S. PATENT DOCUMENTS

| | | | |
|---|---|---|---|
| 3,251,905 | 5/1966 | Zelinski | 260/880 B |
| 3,637,554 | 1/1972 | Childers | 260/876 B |
| 3,639,517 | 2/1972 | Kitchen | 260/879 |
| 3,644,322 | 2/1972 | Farrar | 260/880 B |
| 3,728,300 | 4/1973 | Minekawa | 260/876 B |
| 3,778,490 | 12/1973 | Hsieh | 260/880 B |
| 3,819,767 | 6/1974 | Shimomura | 260/880 B |
| 3,853,978 | 12/1974 | Horiie | 260/880 B |
| 3,872,068 | 3/1975 | Horiie | 260/880 B |
| 3,906,058 | 9/1975 | Durst | 260/876 B |
| 3,907,931 | 9/1975 | Durst | 260/876 B |
| 3,939,224 | 2/1976 | Horiie | 260/880 B |
| 4,054,616 | 10/1977 | Miki | 260/880 B |
| 4,073,831 | 2/1978 | Tabana | 260/880 B |

*Primary Examiner*—Paul R. Michl
*Attorney, Agent, or Firm*—Armstrong, Nikaido, Marmelstein & Kubovcik

[57] ABSTRACT

A novel block copolymer mixture of conjugated diene (C.D.) and vinylaromatic hydrocarbon (V.H.) having a superior transparency and impact-resistance is produced by the following two step polymerizations using an organolithium compound as a catalyst and a solvent consisting mainly of an aliphatic hydrocarbon:

a first step (A) of preparing a living (co)polymer of C.D. or C.D. and V.H., by polymerizing the monomer(s) in a ratio by weight of V.H. to C.D. of 0/100 to 60/40 and in an amount of 1 to 80% by weight of total monomers to be used, in the presence of said catalyst and solvent, and a second step (B) of preparing V.H. polymer or block copolymer of V.H. and C.D., by adding to said living (co)polymer, remaining monomer(s), in a ratio by weight of V.H. to C.D. of 100/0 to 65/35 and in an amount of 99 to 20% by weight of total monomers to be used, and said catalyst and solvent, and polymerizing the remaining monomer(s) to obtain a block copolymer mixture, this block copolymer mixture having a ratio of V.H. content of ultimate block copolymers to that of the (co)polymers obtained only in step (B), of at least 1/1.8, and a ratio of V.H. portion to C.D. portion of 60/40 to 95/5.

5 Claims, No Drawings

PROCESS FOR PRODUCING MIXTURE OF BLOCK COPOLYMERS

DESCRIPTION OF THE INVENTION

This invention relates to a process for producing a mixture of block copolymers having a good transparency and good impact resistance, and more particularly to a novel mixture of block copolymers having a good transparency and a good impact resistance, characterized by producing a mixture of block copolymers consisting of vinylaromatic hydrocarbon and conjugated diene having a ratio by weight of vinylaromatic hydrocarbon to conjugated diene of 60/40 to 95/5 in two steps, using an organolithium compound as a catalyst, and in a solvent of aliphatic hydrocarbon.

Heretofore, in order to improve brittleness of styrene polymers, high-impact polystyrenes, these polymers have been produced according to a process in which a styrene solution of unvulcanized rubber is polymerized in a polymerization manner of bulk, suspension or bulk-suspension. For example, an example of using butadiene-styrene block copolymers as the unvulcanized rubber is disclosed in Japanese Patent Publication No. 14234/66, etc. However, the graft copolymers, as compared with polystyrene, generally have a good impact resistance, but drawbacks that beautiful appearance and good transparency of polystyrene are lost.

To overcome these drawbacks, various processes have been recently proposed for producing block copolymers of styrene by anion polymerization. That is, it is known that when the vinylaromatic compound is in a higher ratio in the block copolymer, a transparent resin having a good impact resistance can be obtained by selecting a block structure and production condition. For example, Japanese Patent Publication No. 3252/72, Japanese Patent Publication No. 2423/73, etc. can be mentioned.

However, in the production of block copolymers having a relatively high content of vinylaromatic hydrocarbon by a conventional anion polymerization, aromatic hydrocarbons such as benzene and toluene, alicyclic hydrocarbons such as cyclohexane and methylcyclohexane, or a mixture of at least two of these hydrocarbons, are used as a polymerization solvent. When these solvents are evaporated into the atmosphere, these solvents cause atmospheric pollution including photochemical smogs, or are harmful to human bodies. Thus, the use of the solvents is not preferable. Occurrence of the photochemical smogs by the hydrocarbon compounds evaporated into the atmosphere has recently come to an attention. Considerable photochemical smogs are observed not only in the case of polar compounds and aromatic hydrocarbons, but also in the case of alicyclic hydrocarbons, and the amount of evaporation of these compounds into the atmosphere is going to be placed under a strict legal control. As its countermeasure, it may be considered to use non-toxic aliphatic hydrocarbons of non-public nuisance type, but when block copolymer having a high content of vinylaromatic compound monomer is subjected to anion polymerization in an aliphatic hydrocarbon solvent, a phase separation occurs, and the resulting copolymers are deposited in a block form or adhered onto vessel walls, stirred blades, etc. Consequently, polymerization operation and product recovery will be difficult to carry out, and there are accompanied so many troubles in commercial scale production.

Furthermore, in the anion polymerization using an aromatic hydrocarbon or alicyclic hydrocarbon as the solvent, a viscosity of the solution is increased with increasing concentration of polymer, and problems are brought about with respect to efficiency of heat removal, stirring power, transfer of product solution, etc., and also there is such a disadvantage as poor productivity.

Heretofore, several processes have been proposed for producing polymers in suspension in a solvent. That is, a process for producing a thermoplastic elastomer is disclosed in Japanese Patent Publication No. 3990/71 by the assignee of the present invention. More recently, a process for producing a transparent block copolymer was disclosed in Japanese Laid-open Patent specifications Nos. 130990/74 and 1193/75. However, in the art of said Japanese Laid-open Patent specifications Nos. 130990/74 and 1193/75, it is necessary to continue the suspension polymerization by successively adding vinylaromatic hydrocarbon monomer to the system at a rate lower than the substantial average rate of polymerization at a polymerization temperature in the second step. Thus, the prior art has such a serious disadvantage that the suspension state cannot be maintained unless the supply of the monomers is strictly controlled.

Furthermore, the feed rate of the monomer is limited, and consequently production speed is low. Only a procedure for accelerating the production speed is to elevate polymerization temperature. In that case, the catalyst is liable to undergo deactivation, and the desired polymer cannot be obtained. As described above, there are accompanied so many troubles in carrying out the prior art processes in a commercial scale production, and these prior art processes cannot be said to provide always good result.

The present inventors have made extensive studies on a process for efficiently producing resins having a good transparency and a good impact resistance under these situations, and as a result have completed the present invention on the basis of a concept and finding quite distinguished from these of the prior art.

The present invention provides a process for producing a block copolymer mixture of conjugated diene and vinylaromatic hydrocarbon which comprises two steps consisting of a first step (A) of preparing (a) living polymer of conjugated diene, (b) random living copolymer of conjugated diene and vinylaromatic hydrocarbon, or (c) living block copolymer consisting of at least one of conjugated diene polymer blocks and at least one of vinylaromatic hydrocarbon polymer blocks, by polymerizing monomers of conjugated diene or conjugated diene and vinylaromatic hydrocarbon, in a ratio by weight of vinylaromatic hydrocarbon to conjugated diene of 0/100 to 60/40 and in an amount of 1 to 80% by weight of total monomers to be used through the two steps, using an organolithium compound as a catalyst and a solvent consisting mainly of aliphatic hydrocarbon, and a second step (B) of preparing (d) vinylaromatic hydrocarbon polymer or (e) block copolymer consisting of at least one of vinylaromatic hydrocarbon polymer blocks and at least one of conjugated diene polymer blocks, while extending copolymer chains or polymer chains obtained in said step (A), by adding to the living (co)polymer obtained in said step (A), remaining monomers of vinylaromatic hydrocarbon or vinylaromatic hydrocarbon and conjugated diene, in a ratio by weight of vinylaromatic hydrocarbon to conjugated diene of 100/0 to 65/35 and in an amount of 99 to 20% by weight of total monomers to be used through the two steps, and an organolithium compound as a catalyst and a solvent consisting mainly of an aliphatic hydrocarbon, and polymerizing the remaining monomers, thereby obtaining a block copolymer mixture, this block copolymer mixture having a ratio of vinylaromatic hydrocarbon content of ultimate block copolymers obtained by combining the monomers added in said step (B), with the living polymer chains formed in said step (A) to vinylaromatic hydrocarbon content of the copolymers obtained only in said (B), of at least 1/1.8, and a ratio of vinylaromatic hydrocarbon portion to conjugated diene portion in said block copolymer mixture, of 60/40 to 95/5.

The present process is characterized by producing a mixture of block copolymers having a good transparency, a good impact resistance and a high vinylaromatic hydrocarbon content very efficiently in a commercial scale in an aliphatic hydrocarbon solvent, which has been so far regarded as infeasible. That is, transparent, impact-resistant resins of polystyrene, etc. have been produced, in the case of solution polymerization, in aromatic hydrocarbon solvent or alicyclic hydrocarbon solvent in almost all cases. In the aliphatic hydrocarbon solvent the resins have been produced only in a very inefficient procedure.

However, it is very surprising that the present mixture can be produced very efficiently in the aliphatic hydrocarbon solvent according to the present invention. Furthermore, the mixture of block copolymers obtained according to the present process are dispersed as very stable, very fine particles in the solvent, and consequently the solution viscosity is very low. That is, it is possible to produce the present mixture, in a higher monomer concentration that has not been conceivable from the conventional concept of solution polymerization, and the stirring power at the time of polymerization is smaller and transfer of polymerization solution, etc. are easier. Thus, the present invention provides a process having a good commercial productivity.

The mixture of block copolymers obtained according to the present process is dispersed in a very stable state in the solvent, and is also obtained in a high solid concentration. Thus, it is possible to use the mixture as it is, as adhesive of non-public nuisance type.

Furthermore, the mixture of block copolymers obtained according to the present process is a mixture of several polymers, and the polymers in mixture integrally demonstrate well balanced suprior properties of impact resistance, tensile strength, elongation, etc.

More surprisingly, the present mixture of block copolymers has a very good transparency, in spite of the existence as a mixture. The present invention provide the mixture of such a very remarkable nature that upsets such common sense that a mixture of polymers having different compositions makes the transparency poorer.

The present invention will be described in detail below:

Organolithium compounds used in the present process are hydrocarbons containing at least one lithium atom in one molecule, and include, for example, n-propyllithium, isopropyllithium, n-butyllithium, sec-butyllithium, tert-butyllithium, n-pentyllithium, lithiumtoluene, benzyllithium, 1,4-dilithio-n-butane, 1,2-dilithio-1,2-diphenylethane, trimethylene dilithium, oligoisoprenyldilithium, etc. Particularly, n-butyllithium and sec-butyllithium are used in the most cases. It is preferable to use the same kind of catalysts in the first and second steps, but they may be different. At least two of these compounds can be used in mixture, if necessary.

Most preferable solvents used in the present process are aliphatic hydrocarbons such as butane, pentane, hexane, heptane, isopentane, octane, isooctane, nonane, etc. and they are used alone or in mixture. Within such a range as being necessary to maintain a dispersion state in said solvent and for properly controlling stability of polymer dispersion, at least one of alicyclic hydrocarbons such as cyclopentane, methylcyclopentane, cyclohexane and methylcyclohexane and aromatic hydrocarbons such as benzene and toluene can be mixed with the solvent. The aliphatic hydrocarbon is used as the solvent to make the mixture of block copolymers present as fine particles. The solvent consisting mainly of the aliphatic hydrocarbon means that a necessary amount of the aliphatic hydrocarbon is contained to attain said object, and the presence of at least 50% by weight of aliphatic hydrocarbon is preferable.

Furthermore, a small amount of a polar compound can be added to the solvent to accelerate a polymerization speed or change a copolymerization reactivity ratio of butadiene to styrene to convert the block copolymers to polymers of desired structure. Examples of such polar compounds include ethers, amines, and thioethers, and more specifically tetrahydrofuran, dimethylether, triethylamine, etc. The amount of the polar compound to be added greatly depends upon the kinds of solvent to be used and polar compound to be used.

Vinylaromatic hydrocarbons used in the present process include styrene, o-methylstyrene, p-methylstyrene, p-tert-butylstyrene, 1,3-dimethylstyrene, α-methylstyrene, vinylnaphthalene, vinylanthracene, etc. and particularly styrene is usually used. They can be used singly or in mixture.

Conjugated dienes used in the present invention are diolefins having a pair of conjugated double bonds having 4 to 8 carbon atoms, and include, for example, 1,3-butadiene, 2-methyl-1,3-butadiene (isoprene), 2,3-dimethyl-1,3-butadiene, 1,3-pentadiene, 1,3-hexadiene, etc. Particularly, 1,3-butadiene and isoprene are usually used. They can be used alone or in mixture.

Vinylaromatic hydrocarbon content of the mixture of block copolymers consisting of vinylaromatic hydrocarbon and conjugated diene is 60 to 95% by weight according to the present invention. When the vinylaromatic hydrocarbon content of the mixture of block copolymers is less than 60% by weight, resinous properties are lost, and hardness and tensile strength are considerably lowered. Thus, it is disadvantageous to use such a mixture for preparation of sheets or films. When the content exceeds 95% by weight to the contrary, the impact resistance is lowered, and tough resins cannot be obtained.

Copolymers or polymers formed in the first step copolymerization or polymerization of the present invention are:

(a) conjugated diene polymers, or
(b) random copolymers of conjugated diene and vinylaromatic hydrocarbon, or
(c) block copolymers consisting of at least one of conjugated diene polymer blocks and at least one of vinylaromatic hydrocarbon polymer blocks.

The copolymer or polymers are produced from 1 to 80% by weight of monomers on the basis of total monomers to be used. In the case of less than 1% by weight, the stability of dispersion of a dispersed solution containing a mixture of block copolymers will be worse in the second step of polymerization, and a phase separation occurs. In the case of more than 80% by weight, the resinous properties are lost, and hardness and tensile strength are considerably lowered. Thus, it is disadvantageous to use such a mixture for sheets or films.

The vinylaromatic hydrocarbon content of said copolymers or polymers (a) to (c) formed in the first step of copolymerization or polymerization must be 0 to 60% by weight according to the present invention. When the vinyl-aromatic hydrocarbon content exceeds 60% by weight, the polymerization in the solvent consisting mainly of aliphatic hydrocarbon will be difficult to carry out owing to the phase separation, and also stability of dispersion of the mixture of copolymers will be worse at the succeeding polymerization, and phase separation will often appear.

Mean molecular weight of said copolymers or polymers (a) to (c) formed in the first step of copolymerization of polymerization according to the present invention is preferably in the range of 1,000 to 300,000. If the mean molecular weight is less than 1,000, the stability of dispersion of the mixture of block copolymers ultimately obtained will be lowered. When the mean molecular weight exceeds 300,000, the resulting mixture of block copolymers will have unpreferably poor processibility.

The block copolymers (c) consisting of at least one of conjugated diene polymer blocks and at least one of vinyl-aromatic hydrocarbon polymer blocks among said copolymers or polymers (a) to (c) formed in the first step of copolymerization or polymerization according to the present process are preferably represented by the following general formulas:

$(A-B)_n$ or $A—(B-A)_n$ or $B—(A-B)_n$ where A is a polymer block consisting mainly of conjugated diene, and B a block consisting mainly of vinylaromatic hydrocarbon, and n is an integer of 1 or more, but in the case that n is 5 or more, the stability of dispersion of the mixture of block copolymers ultimately obtained will be worse. Furthermore, the monomer must be more frequently added, and consequently the polymerization operation will be complicated and disadvantageous in a commercial scale practice. Furthermore, the living polymers are inactivated by the impurities contained in the monomers or solvent, and transparency and tensile strength of the resulting mixture of block copolymers will be disadvantageously lowered. The block copolymers represented by said general formula may be the so-called ideal block copolymer or tapered type block copolymer.

Any well known procedure can be employed for forming the copolymer or polymer (a) to (c) in the first step of copolymerization or polymerization according to the present process. For example, a procedure of using a small amount of polar compound such as ethers or amines in the polymerization system (Japanese Patent Publication No. 15386/61) or a procedure of supplying conjugated diene and vinylaromatic hydrocarbon at a rate less than their polymerization rate (Japanese Patent Publication No. 2394/63) are used for obtaining the random copolymers (b) of conjugated diene and vinylaromatic hydrocarbon. Furthermore, a procedure of producing so-called ideal block copolymers by successive addition of monomer (Japanese Patent Publication No. 19286/61) or a proceudre of producing a tapered type block copolymer by polymerizing a mixture of conjugated diene and vinylaromatic hydrocarbon and utilizing their copolymerization reactivity ratio (Japanese Patent Publication No. 17979/68) are used for obtaining the block copolymer (c).

For obtaining the block copolymer of said general formula $B—(A-B)_n$ in a solvent consisting mainly of the aliphatic hydrocarbon, a dilithium compound is used preferably as the organolithium compound.

Which copolymer or polymer is to be formed among said copolymers or polymers (a) to (c) in the first step of copolymerization or polymerization according to the present process closely depends upon second step copolymerization or polymerization, and its limitation will be described later. The copolymers or polymers (a) to (c) obtained in that manner are used as it is, in the second step polymerization without inactivation. When the copolymers or polymers obtained in the first step polymerization are inactivated by an inactivating agent such as water, methanol, etc., the characteristics of ultimately obtainable mixture of block copolymers, for example, transparency, tensile strength, etc. will be lowered. Thus, such inactivation must be avoided.

Copolymerization or polymerization in the second step of the present process is a step of further extending the chains of said copolymers or polymers (a) to (c) obtained in the first step copolymerization or polymerization and simultaneously forming the following copolymers or polymers by freshly supplying the catalyst and the monomers thereto. That is, the copolymers or polymers formed in the second step polymerization are:

(d) vinylaromatic hydrocarbon polymers or (e) block copolymers consisting of at least one of vinylaromatic hydrocarbon polymer blocks and at least one of conjugated diene polymer blocks. These copolymers or polymers are prepared from 99 to 20% by weight of the monomers on the basis of total monomers to be used, that is, the remaining monomers not used in the first step, and the vinylaromatic hydrocarbon content of the copolymers or polymers (d) or (e) must be 100 to 65% by weight. When the vinylaromatic hydrocarbon content is less than 65% by weight, the resulting solution of a mixture of copolymers or polymers will have a high viscosity, and also it will be difficult to obtain stable dispersed solution. Furthermore, the hardness and tensile strength of the resulting resins will be lowered.

A mean molecular weight of the copolymer or polymer (d) or (e) formed in the second step copolymerization or polymerization according to the present process is preferably 10,000 to 500,000. If the mean molecular weight is less than 10,000, mechanical characteristics of the mixture of block copolymers ultimately obtained, especially impact resistance, are lowered. If the mean molecular weight exceeds 500,000, the stability of dispersion and processibility of the mixture of block copolymers ultimately obtained will be unpreferably poorer.

Among the copolymers or polymers (d) or (e) formed in the second step copolymerization or polymerization according to the present process, the block copolymers (e) consisting of at least one of vinylaromatic hydrocarbon blocks and at least one of conjugated diene polymer blocks are preferably represented by the following general formula:

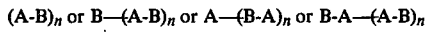

(A-B)$_n$ or B—(A-B)$_n$ or A—(B-A)$_n$ or B-A—(A-B)$_n$ where A is a polymer block consisting mainly of conjugated dienes, B a block consisting mainly of vinylaromatic hydrocarbons, and n is an integer of 1 or more, but n of 5 or more is not preferable for the same reasons as mentioned in connection to the first step polymerization. The block copolymer represented by the general formula may be the so-called ideal type block copolymer or tapered type block copolymer. Any of so far well known procedures can be used for producing the block copolymers, as already described in connection to those for the first step. The block copolymer represented by said general formula B-A—(A-B)$_n$ is the so-called radial block copolymer, and can be produced by coupling a living block copolymer such as B-A$^\ominus$ with a multi-functional coupling agent, for example, polyhalides, diesters, or polyepoxides. When a tetra-functional coupling agent such as stannic tetrachloride, etc. is used, a block copolymer having the following structure can be obtained

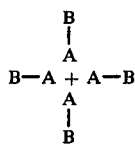

Selection of living polymers (a), (b) and (c) to be formed in the first step (A) according to the present process can be controlled by the amount of monomers used in the reaction, etc. Selection of the copolymer or polymer (d) and (e) to be formed in the second step (B) according to the present process can be similarly controlled.

When monolithium compound is used as the catalyst for the first step polymerization, and vinylaromatic hydrocarbon polymer (d) is formed as the polymer in the second step copolymerization or polymerization according to the present process, the copolymer or polymer to be formed in the first step polymerization must be the block copolymer (c). If not, any tough resin having a good impact resistance cannot be obtained. When the copolymer (e) is formed in the second step copolymerization, the copolymer or polymer to be formed in the first step polymerization may be said (a), (b) or (c).

A ratio of the vinylaromatic hydrocarbon content of the block copolymer ultimately obtained in the step (B) from the living polymers obtained in the first step copolymerization or polymerization to the vinylaromatic hydrocarbon of the copolymer or polymer obtained only in the step (B) must be at least 1/1.8. This condition can be controlled by the amount of monomers. If the ratio is less than 1/1.8, compositions of these two in the mixture of block copolymers ultimately obtained will be so different from each other, that a compatibility between the copolymers or polymers will be worse, and only the resins having a poor transparency and poor physical properties, especially low tensile strength and impact resistance are obtained.

The vinylaromatic hydrocarbon content of the block copolymers ultimately obtained in the step (B) from the living polymers obtained in the first step copolymerization or polymerization can be given by the following formula, so long as the copolymerization or polymerization is complete.

$$\frac{B_1 \times (1 + \frac{C_2}{C_1}) + \frac{M_2}{M_1} \times B_2}{1 + \frac{M_2}{M_1} + \frac{C_2}{C_1}} \text{ \% by weight}$$

wherein $M_1$, $B_1$ and $C_1$ represent weights of monomers used in the first step polymerization, vinylaromatic hydrocarbon content (% by weight) of said monomers, and the effective amount of organolithium compound by moles, respectively, and $M_2$, $B_2$ and $C_2$ represent the corresponding amounts for the second step, and when a compound having n activities is used as the organolithium compound, $C_1$ and/or $C_2$ must be calculated by multiplying $C_1$ and/or $C_2$ by n.

The block copolymer mixture obtained in the present invention is characterized in that the structure of the (co)polymer obtained in the second polymerization step alone is substantially the same as the part of the block copolymer ultimately obtained in the total polymerization of the first and second steps.

Copolymerization or polymerization in the first and second steps is carried out at a temperature of $-40°$ C. to 150° C. according to the present process, but the preferable copolymerization or polymerization temperature is 40° to 120° C. The time required for the polymerization depends upon conditions, but is usually within 48 hours. Most preferable time is 1 to 10 hours. It is desirable to replace the atmosphere of polymerization system with an inert gas such as nitrogen gas, etc. Polymerization pressure may be in a range enough to maintain the monomers and solvent in a liquid phase in said polymerization temperature range, and is not especially limited. Furthermore, it is necessary to pay attention not to allow inclusion of impurities which inactivate the catalyst, for example, water, oxygen, carbon dioxide, etc. to enter the polymerization system and to mix therewith.

A dispersed solution of the mixture of block copolymers formed according to the present process has a good stability and a notably low viscosity, and thus it is possible to conduct copolymerization or polymerization of the monomers at a high concentration. Preferable concentration of monomers in the solvent consisting mainly of aliphatic hydrocarbon is 70% by weight or less. If the concentration exceeds 70%, the dispersed solution of the mixture of block copolymers ultimately obtained will have a higher viscosity, and it is substantially impossible to conduct polymerization.

The mixture of block copolymers obtained through the steps (A) and (B) according to the process of the present invention is inactivated by adding a sufficient amount of a polymerization stopper such as water, alcohols, carbon dioxide, etc. to inactivate the active terminals of the block copolymers. When water or alcohols is used as the polymerization stopper in that case, hydrogen is introduced to the polymer chain terminals, and when carbon dioxide is used, carboxyl groups are introduced thereto. Therefore, a mixture of block copolymers having various functional groups at the terminals can be obtained by properly selecting the polymerization stopper.

The dispersed solution of a mixture of block copolymers obtained according to the present process can be used as an adhesive, coating agent, etc. directly, or after partially distilling off the solvent or concentration.

Furthermore, the mixture of block copolymers of the present invention can be mixed with various stabilizers, intensifiers, fillers, etc. which have been so far employed, and these additives can be added to the dispersed solution of the mixture of block copolymers according to the ordinary procedure, or added to a mixture of block copolymers recovered from the dispersed solution according to the ordinary procedure.

The mixture of block copolymers can be recovered from the dispersed solution thereof obtained according to the process of the present invention by a so far well-known procedure, for example, by precipitating the mixture with a precipitating agent such as methanol, etc., or by heating the dispersed solution to evaporate the solvent, or by injecting steam into the dispersed solution to distill off the solvent by steam distillation to recover the mixture of copolymer.

As described above, the mixture of block copolymers having a good transparency and a good impact resistance obtained according to the present process can be used as a non-toxic adhesive or coating agent of non public nuisance type in the state of suspension in a hydrocarbon solvent, but can be used as a raw material for molding various shaped articles by separating and recovering the mixture from the solvent. That is, the raw molding material of the block copolymers of the present invention thus obtained can be used, directly or after coloring, for the production or extrusion-molded articles such as sheets, films, etc. by similar processing means to that for the ordinary thermoplastic resin, or molded articles shaped by heating in vacuum or with a compressed air, etc., more specifically in a wide variety of application field of packaging materials such as vessels and packagings for food, packaging materials for blisters, packaging films for vegetables, cookies and candies, and also in the fields where the ordinary thermoplastic resins are usually used, for example, in the fields of toys, daily necessaries, sundries, electronic parts by injection molding, blow molding, etc. Especially, the present mixture can be preferably used in the field where a transparency is required, for example, in the field of vessels and packaging materials for food, because the present mixture contains no plasticizer, etc. Furthermore, the present mixture can be mixed with other thermoplastic resin, styrene resins, olefin resins or methacrylic resins in any proportion according to the ordinary procedure, and used.

The present invention will be described in detail below, referring to examples, but these examples are merely illustrative of the present invention, and will never limit the scope of the present invention.

EXAMPLE 1

Styrene-butadiene block copolymers of type A-B-A having a styrene content of 30% by weight were formed in the first step polymerization of the present invention, and styrene-butadiene block copolymers of type B-A-B having a styrene content of 85% by weight were formed in the presence of said living polymer, thereby obtaining a stable dispersion of a mixture of polymers.

The inside atmosphere of an autoclave of pressure-resistant glass having an inside capacity of 2.5 l provided with a stirrer was replaced with a nitrogen gas, and then a 30% by weight n-hexane solution containing 28 g of 1,3-butadiene, which was dehydrated and deaerated in advance, was charged into the autoclave. Then, an n-hexane solution containing 0.14 g of n-butyllithium as an activated lithium compound was added thereto. Polymerization was conducted at 60° C. for one hour, and after the polymerization of the monomers was substantially completed, a 30% by weight n-hexane solution containing 24 g of purified and dried styrene was added thereto. Polymerization was carried out at 60° C. for one hour, and furthermore after the polymerization of the monomers was substantially completed, a 30% by weight n-hexane solution containing 28 g of 1,3-butadiene was added thereto. Polymerization was continued at 60° C. for one hour, whereby an n-hexane solution of concentration of about 30% by weight containing 80 g of ideal block copolymers of type A-B-A having a styrene content of 30% by weight was obtained.

The n-hexane solution of said ideal block copolymers of type A-B-A was used directly in the second step polymerization without inactivating the copolymers with inactivating agent such as water or methanol. That is, a 30% by weight n-hexane solution containing 136 g of styrene and an n-hexane solution containing 0.18 g of n-butyllithium as an activated lithium compound were added to said n-hexane solution of ideal block copolymers, and polymerization was carried out at 60° C. for one hour with stirring. The polymerization solution was a stable, dispersion of low viscosity. After almost all the amount of styrene was polymerized, a 30% by weight n-hexane solution containing 48 g of 1,3-butadiene was added to said polymerization solution, and polymerization was carried out at 60° C. for one hour. The polymerization solution was in a stable, dispersed state, but the viscosity of the solution was somewhat increased. After almost all the amount of 1,3-butadiene was polymerized, a 30% by weight n-hexane solution containing 136 g of styrene was added to said polymerization solution, and polymerization was carried out at 60° C. for one hour. The polymerization solution was again brought into a stable, dispersed state of low viscosity. After styrene completed the polymerization, 10 ml of methanol as a polymerization stopper and 1.2 g of 4-methyl-2,6-di-tertbutylphenol as an antioxidant were added to the resulting dispersion of copolymers.

The dispersion of copolymers thus obtained was a white suspension having a polymer concentration of about 30% by weight, and no deposition of the polymer or adhesion onto vessel walls or stirrer was not observed at all. Furthermore, the dispersion was stable and underwent no change even when left standing for three months. The viscosity of the dispersion of copolymers was measured by a vismetron-type viscosimeter, and found to be 50 cp at 25° C. Sizes of dispersed particles were observed by an optical microscope, and found to be in the range of 0.1 to 5 microns. There were no particles having sizes of more than 10 microns. When the dispersion of copolymers was poured in excess methanol, the copolymers were settled down in a fine particle state. The precipitates were dried under a reduced pressure. The resulting mixture of copolymers was in a transparent, resinous state, and had a good tensile strength and a good impact resistance. Results of analysis and evaluation of physical properties are shown in Table 1.

Comparative Example 1

A dispersion of copolymers was synthesized in the same manner as in Example 1, except that the amount of n-butyllithium was changed in the first step polymerization and the second step polymerization.

That is to say, a dispersion of copolymers was obtained by the same polymerization operations as used in Example 1, using 0.03 g of n-butyllithium as an active lithium compound in the first step polymerization and 0.30 g of n-butyllithium as an active lithium compound in the second step polymerization. The polymerization solution was a stable dispersion, but the polymers recovered from the dispersion were white-turbid, and had a poor transparency.

In this Comparative Example 1, a ratio of the styrene content of the ultimate polymers obtained in the second step polymerization (B) from the living polymer obtained in the first step polymerization to the styrene content of the polymers synthesized in the second step polymerization was 1/1.9.

Comparative Example 2

Synthesis of a dispersion of copolymers was carried out in the same manner as in Example 1, except that n-hexane containing a small amount of methanol was added until yellow color due to the living polybutadienyllithium in the polymerization solution disappeared after the completion of the first step polymerization, and then the second step polymerization was carried out.

The resulting polymerization solution was in the dispersed state of low viscosity, but its stability was very poor. The polymers were settled down immediately when left standing. The precipitated polymers were filtered and recovered, and dried under a reduced pressure. Then, its physical properties were measured. The resulting mixture of copolymers was in an unclear resineous state, and had a poor tensile strength, and a poor impact resistance. Results of analysis and evaluation of physical properties are shown in Table 1.

EXAMPLE 2

Synthesis of a dispersion of copolymers was carried out in the same manner as in Example 1, except that n-hexane solutions whose 1,3-butadiene content and styrene content were 50% by weight were used in the first step polymerization and the second step polymerization.

The resulting polymerization solution was in a stable dispersed state having a polymer concentration of about 50% by weight, and the viscosity of the solution was 300 cp. Physical properties of the copolymers recovered from said dispersion are shown in Table 1. Physical properties of the copolymers were almost same as the physical properties of sample of Example 1 having a lower monomer concentration. No reduction in the mechanical characteristics and transparency due to increase in the monomer concentration was observed at all.

EXAMPLE 3

To a n-hexane solution containing, at a concentration of about 30% by weight, 80 g of ideal block copolymers of type A-B-A having a styrene content of 30% by weight, synthesized in Example 1, were added a 30% by weight n-hexane solution containing 320 g of styrene and a n-hexane solution containing 0.18 g of n-butyllithium as an active lithium compound. Polymerization was carried out at 60° C. for 2 hours with stirring. The resulting polymerization solution was in a stable dispersed state having a viscosity of 30 cp. The copolymers recovered from the dispersion was in a transparent, resinous state, and had a good tensile strength and a good impact resistance. Results of analysis and evaluation of physical properties are shown in Table 2.

EXAMPLE 4

Synthesis of styrene-butadiene block copolymers of type B-A-B having a styrene content of 85% by weight was carried out in the second step polymerization in the presence of styrene-butadiene random copolymers having a styrene content of 20% by weight obtained in the first step polymerization.

Into the autoclave used in Example 1 was charged a n-hexane solution containing 0.14 g of n-butyllithium as an active lithium compound in nitrogen atmosphere. Then, temperature was elevated to 60° C. To the autoclave was added 270 g of a n-hexane solution containing 30% by weight of 1,3-butadiene and styrene at a ratio by weight of the former to the latter of 80/20 over a period of about 2 hours, using a metering pump, whereby a n-hexane solution containing, at a concentration of about 30% by weight, styrene-butadiene random copolymers having a styrene content of 20% by weight was obtained.

To the n-hexane solution of styrene-butadiene random copolymers were added a 30% wt. n-hexane solution containing 136 g of styrene and a n-hexane solution containing 0.18 g of n-butyllithium as an active lithium compound. Polymerization was carried out at 60° C. for one hour with stirring. After almost all the amount of monomers was polymerized, a 30% by weight n-hexane solution containing 48 g of 1,3-butadiene was added to the polymerization solution, and polymerization was carried out at 60° C. for one hour. After almost all the amount of 1,3-butadiene was polymerized, a 30% by weight n-hexane solution containing 136 g of styrene was further added to the polymerization solution. Polymerization was carried out at 60° C. for one hour. The resulting polymerization solution was a stable dispersion. The mixture of copolymers recovered from the dispersion of polymers was in a clear resinous state and had a good impact resistance. Results of evaluation of physical properties are shown in Table 2.

Comparative Example 3

To the n-hexane solution containing, at a concentration of about 30% by weight, 80 g of styrene-butadiene random copolymers having a styrene content of 20% by weight, synthesized in Example 4 were added a 30% by weight n-hexane solution containing 320 g of styrene and a n-hexane solution containing 0.18 g of n-butyllithium. Polymerization was carried out at 60° C. for one hour with stirring. The resulting polymerization solution was in a stable dispersed state. The copolymers recovered from the dispersion were in a transparent, resinous state, but were poor in physical properties, especially impact resistance. Thus, the copolymers were poor for practical use. Results of evaluation of physical properties are shown in Table 2.

EXAMPLE 5

Synthesis of a dispersion of copolymers was carried out in the same manner as in Example 1, except that butadiene homopolymer was prepared by polymerization in place of styrene-butadiene block copolymers of type A-B-A having a styrene content of 30% by weight in the first step polymerization.

Preparation of butadiene homopolymers in the first step polymerization was carried out in the following manner. Into the autoclave used in Example 1 were added a 30% by weight n-hexane solution containing 80 g of 1,3-butadiene and a n-hexane solution containing 0.14 g of n-butyllithium as an active lithium compound under nitrogen gas atmosphere. Polymerization was carried out at 60° C. for one hour, whereby a n-hexane solution containing, at a concentration of about 30% by weight, about 80 g of butadiene polymers was obtained. Then, ideal block copolymers of type B-A-B were synthesized in the n-hexane solution of the polymers, whereby a stable dispersion of copolymers was obtained. The mixture of copolymers recovered from the dispersion was in a transparent, resinous state and had a good impact resistance. Results of evaluation of physical properties are given in Table 2.

Comparative Example 4

To the n-hexane solution containing, at a concentration of about 30% by weight, about 80 g of butadiene homopolymers synthesized in Example 5 were added a 30% by weight n-hexane solution containing 320 g of styrene, and a n-hexane solution containing 0.18 g of n-butyllithium as an active lithium compound. Polymerization was carried out at 60° C. for one hour with stirring. The resulting polymerization solution was in a stable dispersed state, but the copolymers recovered from the dispersion had poor mechanical characteristics, especially poor impact resistance, as shown in Table 2.

Comparative Example 5

Synthesis of a dispersion of copolymers was carried out in the same manner as in Example 5, except that 0.065 g and 0.255 g of n-butyllithium were used as an active lithium compound in the first step polymerization and the second step polymerization, respectively. A ratio of the styrene content of ultimate polymers obtained from the living polymers in the first step polymerization to the styrene content of the polymers obtained in the second step of polymerization was 2.23. The resulting polymerization solution was in a stable dispersed state, but the polymers recovered from the dispersion was white turbid and poor in transparency. Results of evaluation are shown in Table 2.

EXAMPLE 6

The synthesis of a copolymer dispersion consisting of preparing a B-A-B type tapered block copolymer by polymerization in the presence of a living polymer which was an A-B type tapered block copolymer obtained in the first step polymerization was carried out.

A 30% by weight n-hexane solution containing 56 g of 1.3-butadiene and 24 g of styrene and a n-hexane solution containing 0.14 g of n-butyllithium as an active lithium compound, were charged to the autoclave used in Example 1 under nitrogen atmosphere and polymerization was carried out at 60° C. for 3 hours to give a n-hexane solution containing at a concentration of about 30% by weight, about 80 g of an A-B type tapered block copolymer having 30% by weight styrene content.

A 30% by weight n-hexane solution containing 136 g styrene and a n-hexane solution containing 0.18 g of n-butyllithium as an active lithium compound, were added to a n-hexane solution of the above-mentioned A-B type tapered block copolymer and polymerization was carried out with stirring at 60° C. for one hour. The polymerization solution turned to a stable dispersed state. After almost all the styrene has been polymerized, a 30% by weight n-hexane solution containing 48 g of 1,3-butadiene and 136 g of styrene was added to the polymerization solution and polymerization was carried out with stirring at 60° C. for 3 hours to give a stable copolymer dispersion. The solution viscosity of the dispersion was 70 cp.

The copolymer mixture recovered from the above-mentioned copolymer dispersion was a resinous matter which was transparent and superior in impact resistance. The results of evaluation are shown in Table 3.

Comparative Example 6

Synthesis of copolymer dispersion was carried out according to the method which was entirely same with that of Example 6 except that the styrene content in the total amount of monomers used in the first step polymerization was varied.

Namely, the synthesis of a B-A-B type tapered block copolymer having a styrene content of 85% by weight was carried out in a n-hexane solution containing about 30% by weight of an A-B type tapered block copolymer having a styrene content of 70% by weight. After completion of the first step polymerization, it was observed that a greater part of polymer adhered to the inside wall of the autoclave and blades of a stirrer. The polymerization of B-A-B type tapered block copolymer was carried out in the second step, and there was observed no such a phenomenon as re-dissolving or re-dispersion of the polymer which showed phase separation in the first step polymerization. The polymer remained in the state adhering to the wall of the vessel and stirrer blades. The yield of polymer was so extremely low as being 40% by weight per the total monomers used and the composition of resultant polymer was not uniform.

Comparative Example 7

Synthesis of copolymer dispersion was carried out according to the method entirely same with that of Example 6 except that the styrene content in the total amount of monomers used in the second step polymerization was varied.

Namely, a B-A-B type tapered block copolymer having a styrene content of 60% by weight was prepared by polymerization in a n-hexane solution containing about 30% by weight of an A-B type tapered block copolymer having a styrene content of 30% by weight to give a copolymer dispersion.

Resultant polymerization solution was a white viscous solution. The viscosity of the polymerization solution was as high as 10,000 cp.

The styrene content in the copolymer recovered from the polymerization solution was 54%. Since the copolymer was inferior in hardness and tensile strength, those having a practical value as a resin could not be obtained. The results of evaluation are shown in Table 3.

Comparative Example 8

Synthesis of copolymer dispersion was carried out by preparing an A-B-A type tapered block copolymer having a styrene content of 40% by weight in the first step polymerization and then polymerizing styrene in the presence of the resulting living polymer of said copolymer.

A 30% by weight n-hexane solution containing 6 g of 1,3-butadiene and 8 g of styrene and a n-hexane solution containing 0.05 g of n-butyl lithium as an active lithium compound, were charged to the autoclave used in Example 1 under nitrogen atmosphere and polymerization was carried out at 60° C. for one hour. Then a n-hexane solution containing 6 g of 1,3-butadiene was added and polymerized for one hour to give a 30% by weight n-hexane solution containing, at a concentration of about 30% by weight, about 20 g of an A-B-A type tapered block copolymer having a styrene content of 40% by weight. To the resultant solution of the living polymer of said copolymer, were added a 30% by weight n-hexane solution containing 380 g of styrene and a n-hexane solution containing 0.27 g of n-butyllithium as an active lithium compound, and polymerization was carried out with stirring at 60° C. for about 2 hours. The polymerization solution turned to a stable dispersion having a viscosity of 10 cp.

The copolymer mixture having a styrene content of 97% by weight, recovered from said dispersion was a transparent resinous matter but it was inferior in impact resistance. The results of evaluation are shown in Table 3.

Example 7

An A-B-A-B type tapered block copolymer having a styrene content of 90% by weight was synthesized in the presence of a living polymer which was an A-B type tapered block copolymer having a styrene content of 50% by weight, in the first step polymerization to give a copolymer dispersion.

To a n-hexane solution containing, at a concentration of about 30% by weight, about 80 g of A-B type tapered block copolymer having a styrene content of 50% by weight which had been synthesized according to the polymerization procedure same with that of Example 6, were added a 30% by weight n-hexane solution containing 16 g of 1,3-butadiene and 144 g of styrene and a n-hexane solution containing 0.18 g of n-butyllithium as an active lithium compound, and polymerization was carried out with stirring at 60° C. for 2 hours. Thereafter a n-hexane solution containing 16 g of 1,3-butadiene and 144 g of styrene was polymerized with stirring at 60° C. for 2 hours to give a stable dispersion of copolymer. The viscosity of the dispersion was 20 cp. The copolymer recovered from the dispersion was transparent and superior in impact strength. The results of physical properties evaluated are shown in Table 4.

EXAMPLE 8

A synthesis of copolymer dispersion was carried out according to entirely the same method as that of Example 7 except that the ratio of the total weight of monomers used in the first step polymerization relative to the total weight of monomers used in the second step polymerization was different.

Namely, in the presence of about 280 g of an A-B type tapered block copolymer having a styrene content of 50% by weight, a total weight of 120 g of monomers was successively polymerized in the second step polymerization whereby an A-B-A-B type tapered block copolymer having a styrene content of 90% by weight was synthesized to give a copolymer dispersion being stable and having a low solution viscosity. The copolymer mixture recovered from the dispersion was a resinous matter which was transparent and superior in impact strength. The results of evaluation are shown in Table 4.

Comparative Example 9

Synthesis of copolymer dispersion was carried out according to the method entirely same with that of Example 7 except that the ratio of the total weight of monomers used in the first step polymerization to the total weight of monomers used in the second step polymerization was different.

Namely, in the presence of about 2 g of an A-B type tapered block copolymer having a styrene content of 50% by weight, 398 g of monomers in total weight was successively polymerized in the second step polymerization to synthesize an A-B-A-B type tapered block copolymer having a styrene content of 90% by weight whereby a greater part of the polymer showed phase separation in the polymerization and adhered to the wall of vessel and stirrer blades. The polymer which showed the phase separation, did not dissolve or disperse even after completion of polymerization. The yield of total polymer was about 30% by weight relative to the total amount of monomers used. Further, resultant polymer was not uniform.

Comparative Example 10

Synthesis of copolymer dispersion was carried out according to the method entirely same with that of Example 7 except that the ratio of the total weight of monomers used in the first step polymerization to the total weight of monomers used in the second step polymerization was different.

Namely, in the presence of about 360 g of an A-B type tapered block copolymer having a styrene content of 50% by weight, 40 g of monomers in total weight was successively polymerized in the second step polymerization to synthesize an A-B-A-B type tapered block copolymer having a styrene content of 90% by weight. Resultant copolymer dispersion was an extremely viscous white solution having a viscosity of 41,000 cp. The copolymer mixture recovered from the dispersion was an elastomer having a styrene content of 54% by weight and inferior in hardness and tensile strength. The results of evaluation are shown in Table 4.

EXAMPLE 9

Synthesis of copolymer dispersion was carried out according to the method entirely same with that of Example 7 except that five times mols of tetrahydrofuran was used per mol of active n-butyllithium in the first and second polymerizations, respectively.

Resultant copolymer dispersion was a stable dispersion having a viscosity of 40 cp.

The copolymer recovered from the dispersion was superior in transparency, impact strength, and tensile elongation and was an excellent resinous matter which did not whiten even when broken or bent. The results of evaluation are shown in Table 4.

EXAMPLE 10

Synthesis of copolymer dispersion was carried out according to the method entirely same with that of Example 7 except that 0.30 g and 0.03 g of active n-butyllithium were used, respectively in the first step and in the second step polymerization.

Resultant copolymer dispersion was in a stable dispersion state and had a viscosity of 100 cp. The copolymer recovered from the dispersion was a nice resinous matter, superior in transparency and impact resistance which did not show whitening even when broken or bent.

EXAMPLE 11

In the first step polymerization of the present invention, a B-A-B type styrene-butadiene block copolymer having a styrene content of 30% by weight was prepared by using dilithium catalyst, and in the presence of the resulting living polymer, styrene was polymerized with a monolithium catalyst to provide a stable dispersion of polymer mixture.

To the autoclave used in Example 1, was charged a 30% by weight n-hexane solution containing 56 g of 1,3-butadiene under nitrogen atmosphere. Then a n-hexane solution containing 0.07 g of 1,4-dilithio-n-butane as an active lithium compound was added. Polymerization was carried out at 60° C. for one hour and after completion of the polymerization of said monomer, a 30% by weight n-hexane solution containing 24 g of purified and dried styrene and polymerization was carried out at 60° C. for one hour to provide a n-hexane solution containing, at a concentration of 30% by weight, 80 g of a B-A-B type ideal block copolymer having a styrene content of 30% by weight.

To the above-mentioned n-hexane solution of B-A-B type block copolymer, were added a n-hexane solution containing, at a concentration of about 30% by weight, 320 g of styrene and a n-hexane solution containing 0.18 g of n-butyllithium as an active lithium compound and polymerization was carried out with stirring at 60° C. for two hours. Resultant polymerization solution was a stable dispersion of polymer mixture having a viscosity of 20 cp. The physical properties of copolymer mixture recovered from said dispersion are shown in Table 5. Said polymer mixture was a resinous matter superior in transparency, impact resistance and tensile strength.

Comparative Example 11

For the purpose of comparison a synthesis of B-A-B type ideal block copolymer having a styrene content of 85% by weight was carried out in a solvent of toluene.

To a 30% by weight toluene solution containing 170 g of styrene was added to toluene solution containing 0.32 g of n-butyllithium and polymerization was carried out with stirring at 60° C. for one hour. After almost all the amount of styrene was polymerized, a 30% by weight toluene solution containing 60 g of 1,3-butadiene was added to the polymerization solution and polymerization was carried out at 60° C. for one hour. After almost all the amount of 1,3-butadiene was polymerized, a 30% by weight toluene solution containing 170 g of styrene to the polymerization solution and polymerization was carried out at 60° C. for one hour. The solution of B-A-B type ideal block copolymer thus obtained was a transparent viscous solution having a viscosity of 4,000 cp. Said copolymer solution was poured into an excessive amount of methanol and formed precipitate was dried under a reduced pressure whereby a copolymer was obtained which was a resinous matter superior in transparency but inferior in impact resistance. The results of evaluation are shown in Table 5.

Comparative Example 12

To a solution of B-A-B type ideal block styrene-butadiene copolymer having a styrene content of 30% by weight, which was synthesized according to the first step polymerization of Example 10, 5 ml of methanol as a polymerization terminating agent, and 1.2 g of 4-methyl-2,6-di-tert-butylphenol were added and then the polymerization solution was poured into an excessive amount of methanol to obtain a precipitate. After drying under a reduced pressure, resultant precipitate (80 g) was blended with 320 g of a commercially available GP-polystyrene (supplied from Asahi Dow Co. Styron 666) mechanically by using open rolles having a surface temperature of 150° C. Resultant polymer mixture was slightly white-turbid and inferior in transparency. The results of analysis and evaluation of physical properties are shown in Table 5.

Comparative Example 13

To a solution of a B-A-B type ideal copolymer having a styrene content of 30% by weight, which had been synthesized according to the first polymerization process of Example 11, n-hexane containing a small amount of methanol was added with stirring until yellow color of living polymerlithium disappeared. Thereafter to the solution of said polymer were added a n-hexane solution, containing at about 30% by weight concentration, 320 g of styrene and a n-hexane solution containing 0.18 g of n-butyllithium as an active lithium compound, and polymerization was continued with stirring at 60° C. for 2 hours. Resultant polymerization solution was a dispersion of an unstable polymer mixture having a viscosity of 110 cp. The physical properties of the copolymer mixture recovered from said dispersion are shown in Table 6. Said polymer mixture was opaque resinous material inferior in tensile strength and impact strength.

Comparative Example 14

For the purpose of comparison, styrene and n-butyllithium were added to a n-hexane solution in which a small amount of polybutadiene had been dissolved, and polymerization was carried out.

Namely, after 8 g of polybutadiene was added to and dissolved in n-hexane, a n-hexane solution containing at a concentration of about 30% by weight, 392 g of styrene and an n-hexane solution containing 0.32 g of n-butyllithium as an active lithium compound, were added and polymerization was carried out with stirring at 60° C. for 12 hours. Resultant polymerization solution was an unstable dispersion of polymer mixture having a viscosity of 25 cp. and a polymer was immediately precipitated on still standing. The physical properties of polymer mixture recovered from said dispersion are shown in Table 6. Said polymer mixture was opaque resinous matter inferior in impact resistance.

Comparative Example 15

A B-A-B type ideal block copolymer was synthesized in n-hexane.

To 30% by weight n-hexane solution containing 170 g of styrene, a n-hexane solution containing 0.32 g of n-butyllithium as an active lithium compound was added and polymerization was carried out with stirring at 60° C. for one hour. Then a 30% by weight n-hexane solution containing 60 g of 1,3-butadiene was added and polymerization was carried out for one hour. Further a 30% by weight n-hexane solution containing 170 g of styrene was added and polymerization was continued at 60° C. for one hour. Resultant polymerization solution showed perfect phase separation and a part of the polymer adhered to the wall of vessel showing non-uniform state.

Table 1

| Characteristics | | Example 1 | Comp. Ex. 1 | Comp. Ex. 2 | Example 2 |
|---|---|---|---|---|---|
| First step polymerization (A) | Structure of polymer | A—B—A (ideal block) | A—B—A (ideal block) | A—B—A (ideal block) | A—B—A (ideal block) |
| | Styrene content of polymers (wt. %) | 30 | 30 | 30 | 30 |
| Second step polymerization (B) | Structure of polymer | B—A—B (complete block) | B—A—B (ideal block) | B—A—B (complete block) | B—A—B (complete block) |
| | Styrene content of polymers (wt. %) | 85 | 85 | 85 | 85 |
| Amount of monomers used in step (A) (wt. %) | | 20 | 20 | 20 | 20 |
| Amount of monomers in step (B) (wt. %) | | 80 | 80 | 80 | 80 |
| Ratio of styrene content in ultimate polymer *(1) | | 1/1.3 | 1/1.9 | 1/2.8 | 1/1.3 |
| Property of polymerization solution | State of polymerization solution | Stable dispersion | Stable dispersion | Unstable dispersion | Stable dispersion |
| | Viscosity of polymerization solution (cps) (2) Concentration of polymer 30 (wt. %) | 50 | 40 | 30 | 300 |
| Characteristics of copolymer mixture | Styrene content (wt. %) (3) | 76 | 76 | 75 | 75 |
| | Melt flow index (g/10 min.) (4) | 3.8 | 4.3 | 2.2 | 3.5 |
| | Tensile strength at yield (kg/cm$^2$) (5) | 240 | 230 | 200 | 235 |
| | Tensile strength at break (kg/cm$^2$) (5) | 220 | 220 | 180 | 220 |
| | Percentage elongation at break (%) (5) | 15 | 14 | 10 | 13 |
| Characteristics of copolymer mixture | Izod impact strength (kg - cm/cm, notched) (5) | 2.5 | 2.0 | 1.3 | 2.3 |
| | Rockwell hardness (R-scale) (6) | 76 | 77 | 73 | 74 |
| | Transparency (7) | good | poor | poor | good |

(*)Ratio of styrene content of ultimate polymer = $\dfrac{\text{Styrene content of ultimate polymer obtained in step (B) from living polymer of step (A) (wt. \%)}}{\text{Styrene content of copolymer obtained only in step (B) (wt. \%)}}$ Table 2

| Characteristics | | Example 3 | Example 4 | Comp. Ex. 3 | Example 5 | Comp. Ex. 4 | Comp. Ex. 5 |
|---|---|---|---|---|---|---|---|
| First step polymerization (A) | Structure of polymer | A—B—A (ideal block) | A/B (random) | A/B (random) | A | A | A |
| | Styrene content of polymer (wt. %) | 30 | 20 | 20 | 0 | 0 | 0 |
| Second step polymerization (B) | Structure of polymer | B | B—A—B (ideal block) | B | B—A—B (ideal block) | B | B—A—B (ideal block) |
| | Styrene content of polymer (wt. %) | 100 | 85 | 100 | 85 | 100 | 85 |
| Amount of monomers used in step (A) (wt. %) | | 20 | 20 | 20 | 20 | 20 | 20 |
| Amount of monomers used in step (B) (wt. %) | | 80 | 80 | 80 | 80 | 80 | 80 |
| Ratio of styrene content in ultimate polymer *(1) | | 1/1.3 | 1/1.4 | 1/1.4 | 1/1.6 | 1/1.6 | 1/2.2 |
| Property of polymerization solution | State of polymerization solution | Satable dispersion | Stable dispersion | Stable dispersion | Stable dispersion | Stable dispersion | Stable dispersion |
| | Viscosity of polymerization solution (cps) (concentration of polymer 30 wt. %) (2) | 30 | 70 | 35 | 150 | 40 | 170 |
| | Styrene content (wt. %) (3) | 85 | 73 | 83 | 69 | 79 | 69 |
| Characteristics of copolymer mixture | Melt flow index (g/10 min.) (4) | 9.2 | 2.7 | 8.1 | 2.0 | 6.8 | 1.8 |
| | Tensile strength at yield | | | | | | |

Table 2-continued

| Characteristics | | Example 3 | Example 4 | Comp. Ex. 3 | Example 5 | Comp. Ex. 4 | Comp. Ex. 5 |
|---|---|---|---|---|---|---|---|
| | Tensile strength at yield (kg/cm$^2$) (5) | 280 | 220 | 280 | 210 | 255 | 210 |
| | Tensile strength at break (kg/cm$^2$) (5) | 270 | 210 | 275 | 180 | 255 | 180 |
| | Percentage elongation at break (%) (5) | 7 | 8 | 0 | 30 | 2 | 12 |
| Characteristics of copolymer mixture | Izod impact strength (kg-cm/cm, notched) (5) | 2.2 | 2.2 | 1.0 | 2.4 | 1.1 | 2.3 |
| | Rockwell hardness (R-scale) (6) | 90 | 62 | 95 | 40 | 90 | 42 |
| | Transparency (7) | good | good | good | good | good | poor |

(*)Ratio of styrene content of ultimate polymer = $\dfrac{\text{Styrene content of ultimate polymer obtained in step (B) from living polymer of step (A) (wt. \%)}}{\text{Styrene content of copolymer obtained only in step (B) (wt. \%)}}$

Table 3

| Characteristics | | Example 6 | Comp. Ex. 6 | Comp. Ex. 7 | Comp. Ex. 8 |
|---|---|---|---|---|---|
| First step polymerization (A) | Structure of polymer | A—B (tapered block) | A—B (tapered block) | A—B (tapered block) | A—B—A (tapered block) |
| | Styrene content of polymers (wt. %) | 30 | 70 | 30 | 40 |
| Second step polymerization (B) | Structure of polymer | B—A—B (tapered block) | B—A—B (tapered block) | B—A—B (tapered block) | B |
| | Styrene content of polymers (wt. %) | 85 | 85 | 60 | 100 |
| Amount of monomers used in step (A) (wt. %) | | 20 | 20 | 20 | 5 |
| Amount of monomers used in step (B) (wt. %) | | 80 | 80 | 80 | 95 |
| Ratio of styrene content in ultimate polymer *(1) | | 1/1.3 | 1/1.1 | 1/1.2 | 1/1.2 |
| Property of polymerization solution | State of polymerization solution | Stable dispersion | Phase separation | Viscous white turbid solution | Stable dispersion |
| | Viscosity of polymerization solution (cps) (concentration of polymer 30 wt. %) (2) | 60 | — | 10,000 | 10 |
| | Styrene content (wt. %) (3) | 76 | | 54 | 97 |
| Characteristics of copolymer mixture | Melt flow index (g/10 min.) (4) | 3.5 | Measurement was not carried out on account of low polymerization yield and non-uniformity of polymer | 0.5 | 20 |
| | Tensile strength at yield (kg/cm$^2$) (5) | 220 | | 100 | 310 |
| | Tensile strength at break (kg/cm$^2$) (5) | 150 | | 20 | 310 |
| | Percentage elongation at break (%) (5) | 350 | | 950 | 0.8 |
| Characteristics of copolymer mixture | Izod impact strength (kg-cm/cm, notched) (5) | 4.0 | | Measurement impossible (not broken) | 0.8 |
| | Rockwell hardness (R-scale) (6) | 73 | | Measurement impossible (too soft) | 108 |
| | Transparency (7) | good | | good | good |

(*)Ratio of styrene content of ultimate polymer = $\dfrac{\text{Styrene content of ultimate polymer obtained in step (B) from living polymer of step (A) (wt. \%)}}{\text{Styrene content of copolymer obtained only in step (B) (wt. \%)}}$

Table 4

| Characteristics | | Example 7 | Example 8 | Comp. Ex. 9 | Comp. Ex. 10 | Example 9 | Example 10 |
|---|---|---|---|---|---|---|---|
| First step polymerization (A) | Structure of polymer | A—B (tapered block) | A—B (tapered block) | A—B (tapered block) | A—B (tapered block) | A—B (tapered block) | A—B (tapered block) |
| | Styrene content of polymers (wt. %) | 50 | 50 | 50 | 50 | 50 | 50 |
| Second step polymerization | Structure of polymer | A—B—A—B (tapered block) | A—B—A—B (tapered block) | A—B—A—B (tapered block) | A—B—A—B (tapered block) | A—B—A—B (tapered block) | A—B—A—B (tapered block) |

Table 4-continued

| Characteristics | | Example 7 | Example 8 | Comp. Ex. 9 | Comp. Ex. 10 | Example 9 | Example 10 |
|---|---|---|---|---|---|---|---|
| (B) | Styrene content of polymers (wt. %) | 90 | 90 | 90 | 90 | 90 | 90 |
| Amount of monomers used in step (A) (wt. %) | | 20 | 70 | 0.5 | 90 | 20 | 40 |
| Amount of monomers used in step (B) (wt. %) | | 80 | 30 | 99.5 | 10 | 80 | 60 |
| Ratio of styrene content in ultimate polymer *(1) | | 1/1.2 | 1/1.5 | 1/1.0 | 1/1.7 | 1/1.2 | 1/1.2 |
| Property of polymerization solution | State of polymerization solution | Stable dispersion | Stable dispersion | Phase separation | Viscous white turbid solution | Stable dispersion | Stable dispersion |
| | Viscosity of polymerization solution (cps) (concentration of polymer 30 wt. %) (2) | 20 | 1,000 | — | 41,000 | 40 | 100 |
| Characteristics of copolymer mixture | Styrene content (wt. %) (3) | 81 | 62 | | 54 | 81 | 72 |
| | Melt flow index (g/10 min.) (4) | 5.7 | 1.2 | | 0.7 | 2.0 | 2.0 |
| | Tensile strength at yield (kg/cm$^2$) (5) | 240 | 200 | | 110 | 200 | 210 |
| | Tensile strength at break (kg/cm$^2$) (5) | 180 | 150 | Measurement was not carried out on account of low polymerization yield and non-uniformity of polymer | 40 | 100 | 130 |
| | Percentage elongation at break (%) (5) | 300 | 700 | | 850 | 650 | 280 |
| Characteristics of copolymer mixture | Izod impact strength (kg · cm/cm, notched) (5) | 3.6 | 6.0 | | Measurement impossible (not broken) | 4.8 | 4.0 |
| | Rockwell hardness (R-scale) (6) | 80 | 20 | | Measurement impossible (too soft) | 53 | 47 |
| | Transparency (7) | good | good | | good | good | good |

(*)Ratio of styrene content of ultimate polymer = $\dfrac{\text{Styrene content of ultimate polymner obtained in step (B) from living polymer of step (A) (wt. \%)}}{\text{Styrene content of copolymer obtained only in step (B) (wt. \%)}}$ Table 5

| Characteristics | | Example 11 | Comp. Ex. 11 | Comp. Ex. 12 |
|---|---|---|---|---|
| First step polymerization (A) | Structure of polymer | B—A—B (ideal block) | | |
| | Styrene content of polymers (wt. %) | 30 | | |
| Second step polymerization (B) | Structure of polymer | B | B—A—B type (ideal block) styrene-butadiene copolymer obtained by polymerizing in toluene | A polymer mixture obtained by mechanically blending 80 parts by weight of GP polystyrene with 20 parts by weight of a B—A—B type (ideal block) styrene-butadiene copolymer obtained by the first step polymerization of Example 10 |
| | Styrene content of polymers (wt. %) | 100 | | |
| Amount of monomers used in step (A) (wt. %) | | 20 | | |
| Amount of monomers used in step (B) (wt. %) | | 80 | | |
| Ratio of styrene content in ultimate polymer *(1) | | 1/1.4 | | |
| Property of polymerization solution | State of polymerization solution | Stable dispersion | Uniform viscous solution | |
| | Viscosity of polymerization solution (cps) (concentration of polymer 30 wt. %) (2) | 30 | 4,000 | |
| | Styrene content | | | |

Table 5-continued

| Characteristics | | Example 11 | Comp. Ex. 11 | Comp. Ex. 12 |
|---|---|---|---|---|
| | (wt. %) (3) | 85 | 84 | 85 |
| Characteristics of copolymer mixture | Melt flow index (g/10 min.) (4) | 9.2 | 8.5 | 8.7 |
| | Tensile strength at yield (kg/cm$^2$) (5) | 280 | 260 | 260 |
| | Tensile strength at break (kg/cm$^2$) (5) | 270 | 220 | 200 |
| | Percentage elongation at break (%) (5) | 10 | 3 | 3 |
| | Izod impact strength (kg - cm/cm, notched) (5) | 2.2 | 1.2 | 1.0 |
| Characteristics of copolymer mixture | Rockwell hardness (R-scale) (6) | 90 | 96 | 92 |
| | Transparency (7) | good | good | poor |

(*)Ratio of styrene content of ultimate polymer = $\dfrac{\text{Styrene content of ultimate polymer obtained in step (B) from living polymer of step (A) (wt. \%)}}{\text{Styrene content of copolymer obtained only in step (B) (wt. \%)}}$ Table 6

| Characteristics | | Example 11 | Comp. Ex. 13 | Comp. Ex. 14 | Comp. Ex. 15 |
|---|---|---|---|---|---|
| First step polymerization (A) | Structure of polymer | B—A—B (ideal block) | B—A—B (deactivated() ideal block) | Polybutadiene(*) (commercial product) | B—A—B (ideal block) |
| | Styrene content of polymers (wt. %) | 30 | 30 | 0 | 85 |
| Second step polymerization (B) | Structure of polymer | B | B | B | — |
| | Styrene content of polymers (wt. %) | 100 | 100 | 100 | — |
| Amount of monomers used in step (A) (wt. %) | | 20 | 20 | butadiene = 2 | 100 |
| Amount of monomers used in step (B) (wt. %) | | 80 | 80 | styrene = 98 | 0 |
| Ratio of styrene content in ultimate polymer *(1) | | 1/1.4 | — | — | — |
| Property of polymerization solution | State of polymerization solution | Stable(****) dispersion | Unstable dispersion | Unstable dispersion | Phase separation, partly adhered to the wall of vessel |
| | Viscosity of polymerization solution (cps) (concentration of polymer 30 wt. %) (2) | 30 | 110 | 25 | — |
| | Styrene content (wt. %) (3) | 85 | 85 | 97 | |
| Characteristics of copolymer mixture | Melt flow index (g/10 min.) (4) | 9.2 | 5.5 | 17 | |
| | Tensile strength at yield (kg/cm$^2$) (5) | 280 | 230 | 305 | |
| | Tensile strength at break (kg/cm$^2$) (5) | 270 | 210 | 305 | |
| | Percentage elongation at break (%) (5) | 10 | 4 | 0.5 | Measurement was not carried out on account of low polymerization yield and non-uniformity of polymer. |
| Characteristics of copolymer mixture | Izod impact strength (kg - cm/cm, notched) (5) | 2.2 | 1.0 | 0.5 | |
| | Rockwell hardness (R-scale) (6) | 90 | 67 | 111 | |
| | Transparency (7) | good | poor | poor | |

(*)Ratio of styrene content of ultimate polymer = $\dfrac{\text{Styrene content of ultimate polymer obtained in step (B) from living polymer of step (A) (wt. \%)}}{\text{Styrene content of copolymer obtained only in step (B) (wt. \%)}}$ (Note 1)
The vinyl aromatic hydrocarbon content of the ultimate polymer obtained through the step of (b) using the living polymer obtained in the first step polymerization was calculated according to the following formula and ratio to the vinyl aromatic hydrocarbon content of the polymer obtained in the second step polymerization was determined by calculation.

$$\frac{B_1 \times (1 + \frac{C_2}{C_1}) + \frac{M_2}{M_1} \times B_2}{1 + \frac{M_2}{M_1} + \frac{C_2}{C_1}} \quad \text{(weight \%)}$$

$M_1, M_2$: weight of monomer used in the first step polymerization and second step polymerization, respectively.

$B_1, B_2$: Contents of vinyl aromatic hydrocarbon in the monomers used in the first step polymerization and second step polymerization.

$C_1, C_2$: Amounts by mol of organolithium compound used in the first step polymerization and second step polymerization.

(Note 2)
Measured at 25° C. with a vismetron type viscosimeter.
(Note 3)
Quantitatively determined by dissolving samples in chloroform and measuring the absorption intensity of styrene unit with an ultraviolet spectrophotometer.
(Note 4)
Measured according to ASTMD-1238-65T condition G.
(Note 5)
Measured method is JISK-6871
(Note 6)
Measurement method is ASTM D-785, measured by R - scale.
(Note 7)
Judged with naked eyes.

What is claimed is:

1. A process for producing a block copolymer mixture of conjugated diene and vinylaromatic hydrocarbon which comprises two steps of
   a first step (A) of preparing (a) living polymer of conjugated diene, (b) random living copolymer of conjugated diene and vinylaromatic hydrocarbon, or (c) living block copolymer consisting of at least one of conjugated diene polymer blocks and at least one of vinylaromatic hydrocarbon polymer blocks, by polymerizing monomers of conjugated diene or conjugated diene and vinylaromatic hydrocarbon, in a ratio by weight of vinylaromatic hydrocarbon to conjugated diene of 0/100 to 60/40 and the monomers being present in an amount of 1 to 80% by weight of total monomers to be used through the two steps, using an organolithium compound as a catalyst and a solvent consisting mainly of aliphatic hydrocarbon the polymers not being inactivated with an inactivating agent, and
   a second step (B) of (1) preparing (d) vinylaromatic hydrocarbon polymer or (e) block copolymer consisting of at least one of vinylaromatic hydrocarbon polymer blocks and at least one of conjugated diene polymer blocks, and (2) simultaneously extending copolymer chains or polymer chains obtained in said step (A), by adding to the living (co)polymer obtained in said step (A), monomers of vinylaromatic hydrocarbon or vinylaromatic hydrocarbon and conjugated diene, in a ratio by weight of vinylaromatic hydrocarbon to conjugated diene of 100/0 to 65/35 and the monomers being present in an amount of 99 to 20% by weight of total monomers to be used through the two steps, and adding an organolithium compound as a catalyst and a solvent consisting mainly of an aliphatic hydrocarbon, and polymerizing the monomer(s) to simultaneously obtain polymers (d) or (e) and the polymers by extending the chains of polymers of step (A), thereby obtaining a resulting block copolymer mixture,
   said block copolymer mixture having a ratio of vinylaromatic hydrocarbon content of the ultimate block copolymers obtained by combining the monomer(s) added in said step (B), with the living polymer chains formed in said step (A) to vinylaromatic hydrocarbon content of the (co)polymers obtained only in said step (B), of at least 1/1.8, and a ratio of vinylaromatic hydrocarbon portion to conjugated diene portion in said resulting block copolymer mixture, of 60/40 to 95/5.

2. A method for producing a mixture of block copolymers according to claim 1 wherein said organolithium compound is selected from the group consisting of n-propyllithium, iso-propyllithium, n-butyllithium, sec-butyllithium, tertbutyllithium, n-pentyllithium lithium-toluene, benzyllithium, 1,4-dilithio-n-butane 1,2-dilithio-1,2-diphenylethane, trimethylene dilithium, and oligoisoprenyldilithium.

3. A method for producing a mixture of block copolymer according to claim 1 wherein the preparation of the living polymers (a) (b) or (c) and the block copolymers (d) or (e) is carried out in the presence of more than 50% by weight of one or more than one kind of aliphatic hydrocarbon.

4. A method for producing a mixture of block copolymer according to claim 1 wherein said vinylaromatic hydrocarbon is selected from the group consisting of styrene, o-methylstyrene, p-methylstyrene, p-tertbutylstyrene, 1,3-dimethylstyrene, α-methylstyrene, vinylnaphthalene and vinylanthracene.

5. A method for producing a mixture of block copolymer according to claim 1 wherein said conjugated diene is selected from the group consisting of 1,3-butadiene, 2-methyl-1,3-butadiene (isoprene), 2,3-dimethyl-1,3-butadiene, 1,3-pentadiene, and 1,3-hexadiene.

* * * * *